Figure 1:
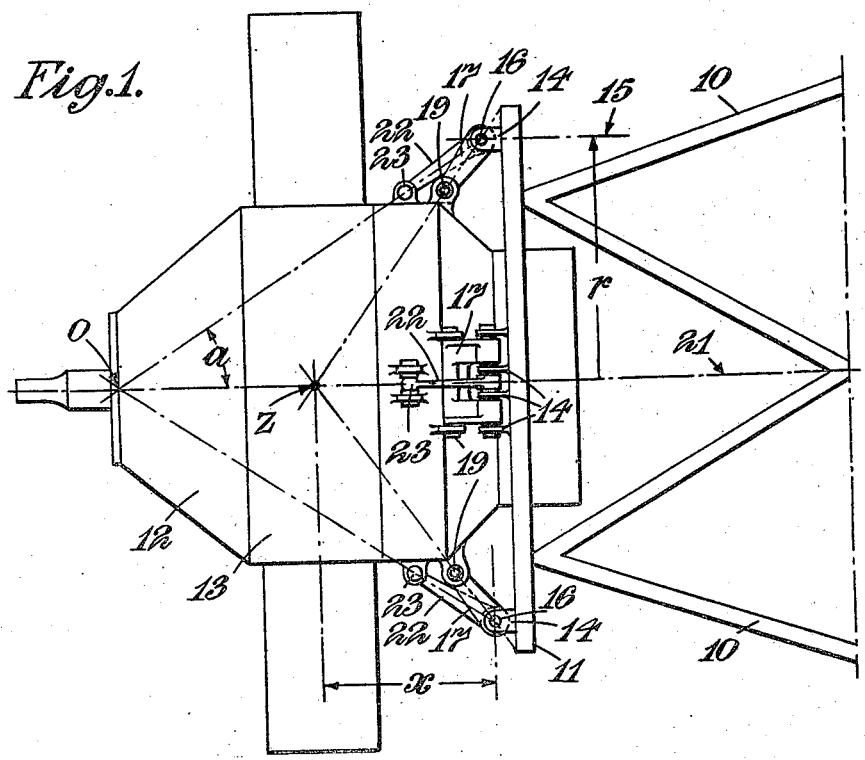

Dec. 28, 1948.   P. E. BERRY   2,457,340
MOUNTING FOR VIBRATORY BODIES
Filed Jan. 16, 1945   2 Sheets-Sheet 1

INVENTOR:
P. E. BERRY
by Wilkinson & Mawhinney
ATTYS

Dec. 28, 1948.   P. E. BERRY   2,457,340
MOUNTING FOR VIBRATORY BODIES
Filed Jan. 16, 1945   2 Sheets-Sheet 2

INVENTOR:
P. E. BERRY

Patented Dec. 28, 1948

2,457,340

UNITED STATES PATENT OFFICE 2,457,340

MOUNTING FOR VIBRATORY BODIES

Philip Edwin Berry, Bristol, England, assignor to The Bristol Aeroplane Company Limited, Bristol, England, a company of Great Britain Application January 16, 1945, Serial No. 573,044
In Great Britain December 30, 1943

Section 1, Public Law 690, August 8, 1946
Patent expires December 30, 1963

4 Claims. (Cl. 248—5)

This invention concerns improvements in or relating to mountings for bodies which are subject to vibration (hereinafter called vibratory bodies) of the kind in which the body is carried by the mounting so as to hang at one side thereof. Mountings of this kind are commonly provided for aircraft power-plants, particularly when the engine is of the radial-cylinder type and comprises flexible or elastic devices interposed between the mounting structure and the body. In connection with such elastic devices, reference will be made to the "principal axis of stiffness" and by this term is meant an axis such that if one part of the device is fixed and a force is applied to another part along that axis, that part moves in the direction of the applied force.

Any vibratory motion of a body can be resolved into three essential modes of vibration namely;

1. Torsional vibration about an axis (the axis of torsion) normal to the plane of the mounting structure, which axis in the case of a power-plant is the crankshaft.

2. Angular vibration about an axis normal to the axis of torsion and passing through the centre of gravity of the body, and 3. Linear vibration in a direction normal to the axis of torsion.

A known form of this kind of mounting for an aircraft power-plant comprises a mounting ring, a plurality of links by which the plant is secured to said ring, and a hollow cylindrical rubber bush arranged between each link and a pin carried tangentially by the ring, said link and bush being capable of pivotal movement upon said pin. The rubber bushes have principal axes of greater and lesser stiffness, the axes of greater stiffness of the various bushes being so disposed as to intersect at a point more remote from the plane of the mounting ring than the centre of gravity of said power plant. This known form of mounting acts as if supporting the plant at its centre of gravity. As a consequence the essential vibratory motions, as defined above, to which the power-plant is subjected are each rendered independent of the others, and can be independently controlled. This attribute of the known form of mounting is hereinafter referred to as that of "decoupling" said vibrations.

Whilst in the known mounting described the modes of vibration (torsional, angular and linear) are decoupled, nevertheless the natural frequency of the angular and linear vibrations are interrelated since both are a function of the angle at which the axis of greater stiffness intercepts the crankshaft axis for a given torsional natural frequency. This is undesirable since if said angle is selected to give a certain value for the linear natural frequency it may be found that the value of the natural frequency for angular vibrations is not the most satisfactory and vice versa. A compromise therefore has to be made. For instance, it is generally found in the case of radial engines (especially the multi-bank type with counter-rotating propellers mounted in the usual plane) that, when the said angle is selected to give the appropriate natural frequency for angular vibrations and when the torsional natural frequency is correct, the natural frequency for linear vibrations is too low to ensure a satisfactory limitation to linear movements of the power plant under the action of transient forces and at low engine speeds.

The present invention has for its object to provide a mounting which will ensure that the various modes of vibration are decoupled and that the values of the torsional, angular and linear natural frequencies of the mounting may be each arbitrarily selected.

According to the present invention a mounting for a vibratory body comprises two set of elastic devices so disposed between the body and its mounting structure that the first set effects along a principal axis of stiffness the only or main control for torsional vibrations, the second set effects along a principal axis of stiffness the whole or a substantial part of the control for angular vibrations, and the two sets conjointly control linear vibrations.

According to another feature of the invention the elastic devices of the first set are so constructed as to have two principal axes of stiffness whereof one is tangential to a circle co-axial with the axis of torsion and the other intersects the corresponding axes of the other devices of that set either at the centre of gravity of the body, or near it at a point between it and the plane of the mounting structure.

According to yet another feature of the invention the elastic devices of the second set are so constructed as to have each a principal axis of stiffness so directed that all of the said axes intersect at a point beyond the centre of gravity of the body, and the said devices are connected either to the body or to the mounting structure each by a universal joint.

Figure 2:
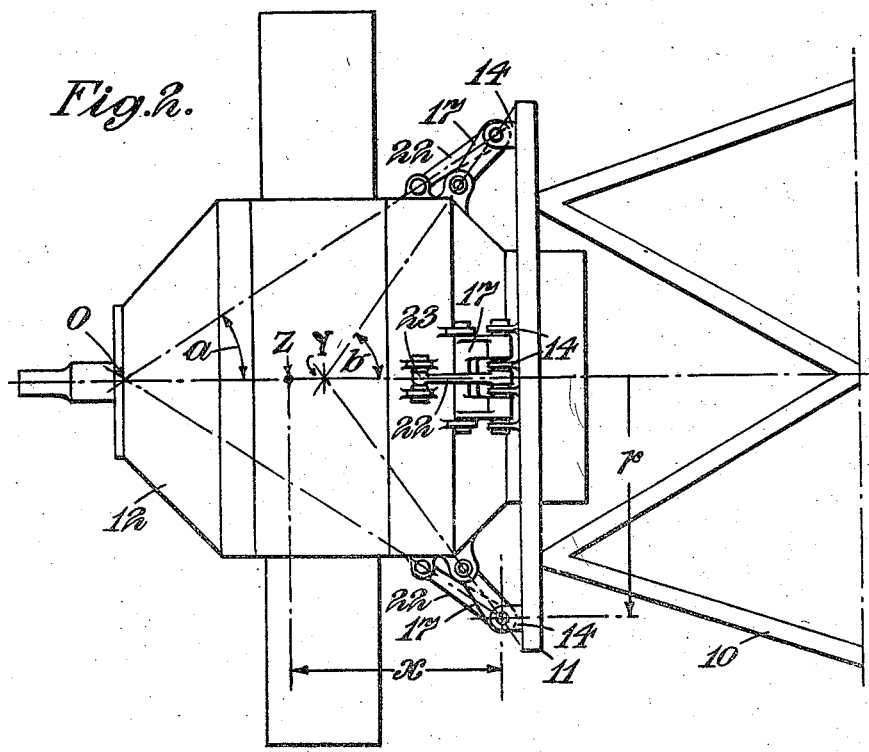
Figure 4:
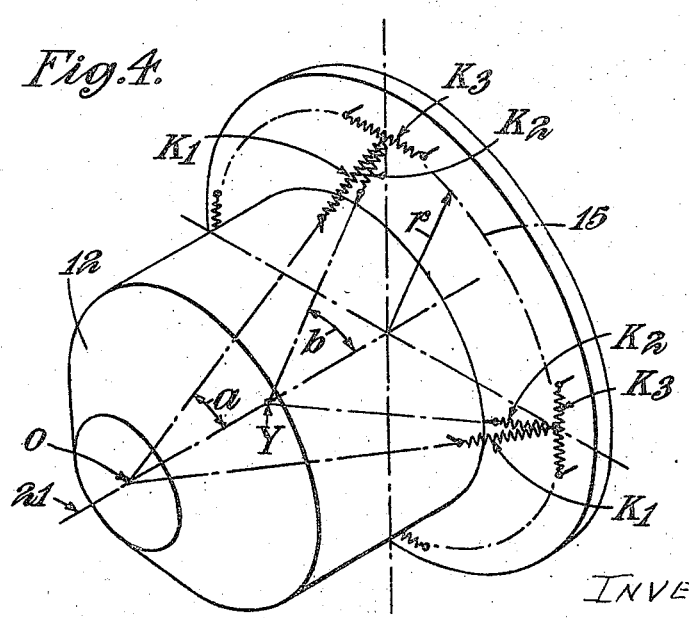

Specific embodiments of the invention as applied to a mounting for a power plant for an aircraft will now be described, merely by way of example, with reference to the accompanying drawings whereof:

Figure 1 is a side elevation of the preferred form of mounting in accordance with the present invention, Figure 2 is a side elevation of another embodiment in accordance with the present invention, Figure 3 is a view of the means by which the power plant is supported from the mounting structure in the embodiments of Figures 1 and 2, said view being partly in section, and Figure 4 is a diagrammatic perspective view of a mounting in accordance with the present invention.

As shown in Figures 1 and 2 the mounting structure comprises a plurality of struts 10, which are secured to the fuselage of the aircraft and to which a mounting ring 11 is rigidly attached. The power-plant, which is indicated in general by the reference 12, comprises an engine 13 of the radial-cylinder type, together with its accessories and airscrew. The power-plant is secured to the mounting ring 11 as will be hereinafter described.

At each of four equi-distant points around the mounting ring there is provided a group of four brackets 14. All the groups lie upon the same pitch-circle 15 and each provides support for a hinge-pin 16 (see Figure 2) which lies on the engine-side of the mounting ring and is disposed tangentially to said pitch circle.

The brackets 14 are spaced apart to receive and locate between them a U-shaped arm 17, the free ends of the legs 18 of which embrace the end portions of the pin 16. The arm 17 is attached to te engine 13 by means of a bolt 19 which extends through the base or cross-piece 20 of the U-shaped arm, so as to lie parallel with the longitudinal axis of the hinge pin 16. The arm 17 is capable of pivotal movement about both the pin 16 and the bolt 19. The axis of the arm 17 (that is the axis joining the centres of the hinge pin 16 and bolt 19 as is shown in Figures 1 and 2) intersects the crankshaft axis 21, it being assumed that the centre of gravity of the power plant lies on this axis.

Carried by the central portion of the hinge pin 16 is a link 22 one end of which embraces and can turn on the pin, whilst the other end is attached to the engine 13 by means of a universal or spherical joint 23. The axis of the link (that is the axis joining the centres of the hinge pin 16 and universal joint 23, Figures 1 and 2) intersects the crankshaft axis 21 at a point O which is more remote from the plane of the mounting ring 11 than is the centre of gravity Z of the power plant.

In order to provide for decoupling of the three modes of vibration to which the power plant is subjected, elastic devices in the form of rubber blocks are provided between the link 22 and the hinge-pin 16 and between each leg of the U-shaped arm 17 and the hinge-pin. Each rubber block, 24b and 24a, respectively is in the form of a hollow cylindrical bush the inner cylindrical face of which is bonded to a thin metal sleeve 25b, 25a rotatable on the hinge-pin 16 whilst its outer surface is enveloped by and bonded to another metal sleeve 26b, 26a respectively, secured in the link 22 or legs 18 of arm 17.

Each of the rubber bushes 24a, 24b has two effective principal axes of stiffness. That is, as shown in Figure 4 the brush 24b associated with the link 22 has a stiffness $K_1$ in the direction of the length of the link and a stiffness at right angles thereto along the central axis of the cylindrical bush. Similarly the lateral bushes 24a each has a stiffness $K_2$ in the direction of the axis of the arm 17 and a stiffness $K_3$ in a direction at right angles thereto along the central axis of the cylindrical bushes. It is arranged in the particular construction shown in Figures 1 and 2 that the stiffness $K_2$, $K_1$ of the bushes 24a, 24b is greater than their stiffness along the axis of the bushes.

Disposed between each end of the lateral rubber brushes 24a and the brackets 14 between which they are carried is a snubbing disc 27.

In the construction shown in Figure 1 the axis of the arm 17 intersects the crankshaft axis 21 at the centre of gravity Z of the power plant 12. This is the preferred construction of the invention. In this construction the three modes of vibration produce the following effects:

(a) Torsional vibrations are transmitted by the arm 17 to the lateral rubber bushes 24a in the direction of the central axis of the bushes, that is, in the direction of the axis of lesser stiffness $K_3$ of the bush (Figure 4). The universal joint 23 by which the link 22 is attached to the engine 13 ensures that said torsional vibrations are not transmitted to the link or to the central bush 24b to any appreciable extent; they could be completely isolated from the bush 24b by providing a universal joint between the link 22 and the outer sleeve 26b of the bush.

(b) Angular vibrations are transmitted only to the central rubber bush 24b in the direction of the long axis of the link 22, that is, radially to the bush and along its axis of greater stiffness $K_1$. As the long axis of the arm 17 passes through the centre of gravity Z of the power plant and the angular vibrations referred to occur about an axis passing therethrough, these vibrations will not be transmitted to the lateral rubber bushes 24a, (c) Linear vibrations are transmitted to both the lateral and central rubber bushes 24a, 24b through their associated arm 17 and link 22 respectively. The direction of the loading thereby produced (with reference to the lateral rubber brushes) depends upon the disposition of the bushes in relation to the direction of the linear vibrations, being either along the axis of the arm 17 or along the axis of the hinge pin 16 or both simultaneously when the vibration has components along both of these axes. The direction of the loading with reference to the central bush is along the axis of the link 22, the loading being limited to this direction by the universal joint 23.

By suitably positioning the elastic devices 24a and 24b and selecting appropriate stiffnesses for them, the mounting described with reference to Figure 1 will enable the three modes of vibration which may be present to be rendered independent of one another that is, the presence of one mode has no tendency to produce vibrations of another mode. This means that the vibrations are decoupled as in the known form of mounting referred to. However it will be noted that the torsional vibrations are taken by the lateral bushes 24a along their axis of lesser stiffness $K_3$, the angular vibrations are taken by the central bush 24b along its axis of greater stiffness $K_1$ and the linear vibrations are taken by the central bush 24b along its axis of greater stiffness $K_1$ and by the lateral bushes 24a along both the axis of greater and lesser stiffness $K_2$ and $K_3$ respectively. Since the stiffness of the bushes along each of the two principal axes referred to may be selected in an entirely independent manner it follows that the value of the natural frequency of torsional vibration may be independently and arbitrarily chosen. The stiffness of the central bush 24b and the inclination of the axis along which it lies relative to the crankshaft axis 21 (angle a of Figure 1) are selected to give the value of natural frequency of angular vibrations which is desired. As indicated above, under these circumstances the natural frequency of linear vibrations which will be obtained will be less than the desired value: however the stiffness of the lateral bushes 24a along their axes of greater stiffness is selectable independently of the stiffness chosen to give the required value to the natural frequency of torsional vibrations. Accordingly a value is selected for the stiffness $K_2$ which in conjunction with the value of linear natural frequency for the central bush 24b will give the linear natural frequency which is desired. In effect therefore the natural frequency of all three modes of vibration can be arbitrarily selected.

In practice having selected a value $K_3$ (Figure 4) for the total stiffness along the central axis of the lateral rubber bushes 24a and the value $K_1$ for the radial stiffness of the central bushes so that these will give respectively the desired value of natural frequency of torsional and angular vibrations, then the angle $a$ which the long axis of the link 22 makes with the crankshaft axis 21 must be such as to satisfy the general equation:

$$\frac{K_1}{K_3} = \frac{\frac{2x}{r}}{\sin 2a - \frac{2x}{r}\sin^2 a}$$

where $x$ = distance between the plane of the rubber blocks and the centre of gravity Z of the power-plant, and $r$ = radius of the pitch-circle 15.

In the alternative construction shown in Figure 2 the long axis of the arm 17 intersects the crankshaft axis 21 at the point Y which is situated behind the centre of gravity Z of the power-plant 12, that is on the mounting-ring side thereof. With this construction the three modes of vibration generally produce the effects described with reference to the construction of Figure 1. However, by offsetting the long axis of the arm 17 from the centre of gravity Z of the power-plant, the angular vibrations are transmitted in part, and preferably in the greater part, to the central rubber bush 24b and in a lesser part to the lateral rubber bushes 24a. Similarly although the linear vibrations are transmitted in greater part to the lateral rubber bushes 24a, a certain proportion of the linear vibrations are also transmitted to the central rubber bush 24b as described in the construction with reference to Figure 1. The torsional vibrations are transmitted by the arm 17 only to the lateral rubber bushes 24a in the direction of the central axis of the bushes, that is in the direction of lesser stiffness $K_3$ of the bush.

As in the construction of Figure 1 the vibrations are de-coupled so that the presence of one mode has no tendency to produce vibrations of another mode. Moreover, since the torsional vibrations are taken by the lateral bushes 24a along their axis of lesser stiffness $K_3$, the angular vibrations are taken in the main by the central bush 24b along its axis of greater stiffness $K_1$ and the linear vibrations are taken in the main by the lateral bushes 24a along their axis of greater stiffness $K_2$ and since the stiffness of the bushes along the two principal axes referred to may be selected in an entirely independent manner it follows:

(i) That the value of the natural frequency of torsional vibration may be independently and arbitrarily chosen, (ii) That the stiffness $K_1$ of the central bush 24b and the angle $a$ may be selected to give a value of natural frequency of angular vibrations for bush 24b which in conjunction with the value of angular natural vibrations for the lateral bushes 24a gives the natural frequency which is desired.

(iii) That the stiffness $K_2$ of the lateral bushes 24a and the inclination of the axis of arm 17 to the crankshaft axis 21 (angle $b$ of Figure 3) may be selected to give a value of natural frequence of linear vibrations for bushes 24a which in conjunction with the value of linear natural frequency for the central bush 24b will give the natural frequency which is desired.

In effect therefore whilst the angular vibrations are taken in greater part by the central bush, the linear vibrations in greater part by the lateral bushes (each along their axis of greater stiffness) and the torsional vibrations only by the lateral bushes along their axis of lesser stiffness, it is possible to select the natural frequency of all the modes of vibration in an independent and arbitrary manner.

With the construction described with reference to Figure 2, in order to obtain decoupling of the modes of vibration the following expression should be satisfied:

$$x(K_3 + K_2 \sin^2 b + K_1 \sin^2 a) - \tfrac{1}{2}r(K_2 \sin 2b + K_1 \sin 2a) = 0$$

where $x$ = the distance between the plane of the rubber blocks and the centre of gravity Z of the power plant.

$r$ = radius of the pitch circle 15.

$a$ = the angle which the long axis of link 22 makes with the crankshaft axis.

$b$ = the angle which the long axis of the arm 17 makes with the crankshaft axis.

$K_1$ = the radial stiffness of the central bush 24b.

$K_2$ = the radial stiffness of the pair of lateral rubber bushes 24a.

$K_3$ = total stiffness along the central axis of the lateral rubber bushes 24a.

It is to be understood that although in the construction described the lateral and central rubber bushes at each attachment point form a sandwich, nevertheless the two lateral bushes may be replaced by a single bush in which case the rubber bush associated with the link could be located (if equal in number and on the same pitch circle) between adjacent pairs of such rubber blocks, and spaced apart therefrom around the mounting ring: but it is clearly not necessary that the bushes associated with the link should be equal in number or lie on the same pitch circle or lie in the same plane as the bushes associated with the hinged arm. When they are thus separated, the universal joint 23 may be replaced by a universal joint between the hinge-pin in the bush 24b and the mounting structure 10, 11.

In the design of engine-mountings such as described above, it is possible for the natural frequency of linear vibrations to be too high when the natural frequency of angular vibrations has its desired value. With the present day trends in engine-design however, the tendency is for the natural frequency of linear vibrations to become lower so that the conditions which most likely will have to be met will be where the natural frequency of linear vibrations is too low when the natural frequency of angular vibrations has its desired value. The present invention may be usefully applied in the latter circumstances.

I claim:

1. A suspension for carrying an overhanging vibratory body from a support comprising devices spaced about said support each device having a member for attachment to the support, a member for attachment to the vibratory body and an elastic member disposed between said support and the body-attachment members, said elastic members for one set of suspension devices having two principal axes of stiffness whereof one is tangential to a circle co-axial with the axis of torsion and the other intersects the corresponding axes of the other devices of that set at the centre of gravity of the body and said elastic members for the other set of suspension devices having a principal axis of stiffness directed to intersect at a point beyond the centre of gravity of the body from the plane of suspension thereof.

2. A suspension for carrying an overhanging vibratory body from a support comprising devices spaced about said support each device having a member for attachment to the support, a member for attachment to the vibratory body and an elastic member disposed between said support and the body-attachment members, said elastic members for one set of suspension devices having two principal axes of stiffness whereof one is tangential to a circle co-axial with the axis of torsion and the other intersects the corresponding axes of the other devices of that set adjacent the centre of gravity of the body at a point between the centre of gravity and the plane of suspension of the body and said elastic members for the other set of suspension devices having a principal axis of stiffness directed to intersect at a point beyond the centre of gravity of the body from the plane of suspension thereof.

3. A suspension for an overhanging vibratory body as claimed in claim 1 wherein the elastic members of the other set of suspension devices are connected to the body each by a universal joint.

4. A suspension for an overhanging vibratory body as claimed in claim 2 wherein the elastic members of the other set of suspension devices are connected to the body each by a universal joint.

PHILIP EDWIN BERRY.

REFERENCES CITED

The following references are of record in the file of this patent:

UNITED STATES PATENTS

| Number | Name | Date |
| --- | --- | --- |
| Re. 21,328 | Stitz | Jan. 16, 1940 |
| 2,056,733 | Neale | Oct. 6, 1936 |
| 2,175,825 | Browne et al. | Oct. 10, 1939 |
| 2,175,999 | Taylor | Oct. 10, 1939 |
| 2,270,673 | Lord | Jan. 20, 1942 |
| 2,329,829 | Clayton | Sept. 21, 1943 |
| 2,368,334 | Tyler | Jan. 30, 1945 |
| 2,351,427 | Henshaw | June 17, 1944 |
| 2,369,077 | Seidel et al. | Feb. 6, 1945 |
| 2,385,759 | Henshaw | Sept. 25, 1945 |